(12) United States Patent
Matthews-López et al.

(10) Patent No.: US 9,355,373 B2
(45) Date of Patent: May 31, 2016

(54) OUTLIER DETECTION TOOL

(75) Inventors: Joy L. Matthews-López, Athens, OH (US); Paul E. Jones, Spanish Fork, UT (US)

(73) Assignee: NATIONAL ASSOC. OF BOARDS OF PHARMACY, Mount Prospect, IL (US)

( * ) Notice: Subject to any disclaimer, the term of this patent is extended or adjusted under 35 U.S.C. 154(b) by 883 days.

(21) Appl. No.: 13/587,022

(22) Filed: Aug. 16, 2012

(65) Prior Publication Data

US 2013/0226519 A1 Aug. 29, 2013

Related U.S. Application Data

(60) Provisional application No. 61/602,882, filed on Feb. 24, 2012.

(51) Int. Cl.
| | |
|---|---|
| *G06F 17/18* | (2006.01) |
| *G06Q 10/00* | (2012.01) |
| *G05B 23/02* | (2006.01) |
| *G06F 17/30* | (2006.01) |
| *G09B 7/00* | (2006.01) |

(52) U.S. Cl.
CPC .............. *G06Q 10/00* (2013.01); *G05B 23/024* (2013.01); *G06F 17/18* (2013.01); *G06F 17/30719* (2013.01); *G09B 7/00* (2013.01)

(58) Field of Classification Search
USPC .......................................................... 702/179
See application file for complete search history.

(56) References Cited

U.S. PATENT DOCUMENTS

| | | | | |
|---|---|---|---|---|
| 5,059,127 | A * | 10/1991 | Lewis et al. ................... | 434/353 |
| 6,960,088 | B1 | 11/2005 | Long | |
| 2003/0134261 | A1* | 7/2003 | Jennen et al. .................. | 434/354 |
| 2004/0059736 | A1* | 3/2004 | Willse et al. ................... | 707/100 |
| 2004/0229199 | A1* | 11/2004 | Ashley et al. ................. | 434/323 |
| 2005/0222799 | A1* | 10/2005 | Bolt et al. ...................... | 702/127 |
| 2007/0048723 | A1 | 3/2007 | Brewer et al. | |
| 2010/0185957 | A1 | 7/2010 | Van Ieperen et al. | |
| 2011/0244440 | A1* | 10/2011 | Saxon et al. ................... | 434/362 |

OTHER PUBLICATIONS

Website: "WINSTEPS Rasch Measurement Software," retrieved from http://www.winsteps.com, Jun. 20, 2009, 2 pages.
Website: "FACETS Many-Facet Rasch Measurement," retrieved from http://www.winsteps.com, Jun. 20, 2009, 2 pages.
International Search Report and Written Opinion for App. No. PCT/US13/27440 dated May 3, 2013.
International Preliminary Report on Patentability for corresponding International Application No. PCT/US2013/027440, mailed Sep. 4, 2014.
International Preliminary Report on Patentability for corresponding International Application No. PCT/US2013/027320, mailed Sep. 4, 2014.
International Preliminary Report on Patentability for corresponding International Application No. PCT/US2013/027322, mailed Sep. 4, 2014.

* cited by examiner

*Primary Examiner* — Paul D Lee
(74) *Attorney, Agent, or Firm* — Marshall, Gerstein & Borun LLP; Randall G. Rueth

(57) ABSTRACT

A test results screening tool allows capture of test item and test results data and provides a reviewer with a robust set of tools for entering screening criteria and display of test results by both test subject and test center. The tool includes parametrically sets flags for unwanted testing behaviors including test item harvesting, test subjects with pre-knowledge of the test subject matter, and proxy test takers for some a portion of a test.

19 Claims, 15 Drawing Sheets

Test Delivery via Multiple Test Centers

| ENTRY | MEASURE | STATUS | COUNT | SCORE | ERROR | IN.MSQ | IN.ZSTD | OUT.MSQ | OUT.ZSTD | DISPLACE | PTME | WEIGHT | OBSMATCH | EXPMATCH | NAME |
|---|---|---|---|---|---|---|---|---|---|---|---|---|---|---|---|
| 1 | -0.8446 | 1 | 250 | 96 | 0.1397 | 1 | 0.08 | 1 | -0.01 | -0.0002 | 0.36 | 1 | 64.4 | 67.9 | 9509 |
| 2 | -0.8371 | 1 | 250 | 95 | 0.1392 | 1.07 | 1.4 | 1.15 | 2.06 | -0.0001 | 0.25 | 1 | 65.2 | 67.7 | 9584 |
| 3 | -0.6871 | 1 | 250 | 104 | 0.138 | 0.97 | -0.66 | 0.95 | -0.67 | -0.0002 | 0.4 | 1 | 69.6 | 66.9 | 6909 |
| 795 | 0.4763 | 1 | 250 | 165 | 0.1435 | 0.91 | -1.65 | 0.88 | -1.49 | 0 | 0.46 | 1 | 75.2 | 69.9 | 2766 |
| 796 | -0.3453 | 1 | 245 | 120 | 0.1379 | 1.03 | 0.6 | 1.02 | 0.35 | -0.0001 | 0.34 | 1 | 63.7 | 66.1 | 24645 |
| 797 | 0.2911 | 1 | 250 | 156 | 0.1404 | 1 | -0.02 | 0.98 | -0.21 | 0.0001 | 0.37 | 1 | 70.4 | 68.3 | 8729 |
| 798 | 0.1517 | 1 | 250 | 148 | 0.1378 | 0.97 | -0.52 | 0.99 | -0.2 | 0.0001 | 0.38 | 1 | 67.6 | 66.4 | 133 |
| 799 | -0.6873 | 1 | 250 | 104 | 0.1381 | 1.05 | 1.03 | 1.07 | 0.99 | -0.0001 | 0.31 | 1 | 64.8 | 67.1 | 4179 |
| 800 | -0.3154 | 1 | 250 | 124 | 0.1364 | 0.96 | -0.89 | 0.93 | -1.17 | 0 | 0.42 | 1 | 66.4 | 66 | 11627 |
| 801 | -0.783 | 1 | 250 | 99 | 0.139 | 1 | -0.07 | 0.95 | -0.57 | -0.0002 | 0.37 | 1 | 66.4 | 67.5 | 15205 |
| 802 | -0.5205 | 1 | 250 | 113 | 0.1369 | 1.05 | 1.08 | 1.06 | 0.98 | -0.0001 | 0.31 | 1 | 64.4 | 66.2 | 17332 |
| 803 | 1.1052 | 1 | 250 | 193 | 0.1596 | 0.94 | -0.72 | 0.91 | -0.69 | 0.0002 | 0.39 | 1 | 78.8 | 78.1 | 7265 |
| 804 | -0.3306 | 1 | 250 | 123 | 0.1364 | 1.03 | 0.58 | 1.01 | 0.23 | -0.0001 | 0.34 | 1 | 63.6 | 66 | 27220 |

| ID | TestCenter | Case | OP θ | SE | P/F | Infit | Outfit | EXP%-OBS% | Unexp Resp | Time (min) | Md RT (sec) | Rapid Resp | Slow Resp | Omits | Response Flags | Time Flags |
|---|---|---|---|---|---|---|---|---|---|---|---|---|---|---|---|---|
| 9509 | 5 | Case 1 | -1.0696 | 0.156 | F | 1 | 1 | 3.50% | 0 | 277.9 | 64.5 | 0 | 0 | 0 | | |
| 2913 | 9 | Case 23 | -1.295 | 0.1608 | F | 1.18 | 1.21 | 7.60% | 9 | 165.5 | 35.0 | 0 | 0 | 0 | | |
| 29026 | 4 | Case 24 | -0.354 | 0.1503 | P | 1.18 | 1.23 | 10.80% | 2 | 231.6 | 45.0 | 0 | 0 | 0 | RAND | |
| 25523 | 8 | Case 25 | -0.6253 | 0.1509 | F | 0.97 | 0.97 | 2.30% | 2 | 283.8 | 58.0 | 1 | 0 | 0 | | |
| 20965 | 9 | Case 26 | -0.9733 | 0.1545 | F | 1.04 | 1.14 | 2.00% | 5 | 281.2 | 57.0 | 1 | 0 | 0 | | |
| 22177 | 4 | Case 27 | -0.9258 | 0.1538 | F | 1.12 | 1.13 | 8.10% | 1 | 200.5 | 38.0 | 0 | 0 | 0 | | |
| 24772 | 4 | Case 28 | -1.4269 | 0.1643 | F | 1.07 | 1.54 | -0.40% | 10 | 322.3 | 66.5 | 0 | 1 | 0 | OUT (1.54) | |
| 22758 | 3 | Case 92 | -0.9495 | 0.1541 | F | 1.16 | 1.31 | 6.60% | 6 | 291.5 | 57.0 | 1 | 0 | 0 | | |
| 16109 | 5 | Case 93 | -0.9495 | 0.1541 | F | 1.13 | 1.27 | 5.90% | 4 | 305.2 | 63.0 | 0 | 0 | 0 | | |
| 396 | 3 | Case 94 | -0.8787 | 0.1532 | F | 1.04 | 1.02 | 1.90% | 4 | 405.0 | 94.0 | 13 | 0 | 0 | | LONG (405) |
| 9635 | 9 | Case 119 | -0.8553 | 0.1529 | F | 0.95 | 0.93 | -1.40% | 2 | 317.8 | 60.0 | 2 | 1 | 0 | | |
| 2326 | 3 | Case 120 | -0.7856 | 0.1521 | F | 1.06 | 1.19 | 3.90% | 2 | 114.7 | 21.0 | 21 | 0 | 0 | | SHORT (114.7) |
| 12489 | 3 | Case 121 | 0.8915 | 0.174 | P | 0.93 | 0.85 | 1.80% | 3 | 317.5 | 59.5 | 1 | 1 | 0 | | |
| 3617 | 1 | Case 122 | -0.2862 | 0.1504 | P | 0.95 | 0.92 | -3.20% | 1 | 322.8 | 63.0 | 3 | 3 | 0 | | |
| 6745 | 7 | Case 123 | -1.0696 | 0.156 | F | 1.11 | 1.2 | 2.80% | 5 | 280.1 | 61.0 | 0 | 0 | 0 | | |
| 23834 | 4 | Case 124 | 1.618 | 0.2127 | P | 0.9 | 0.89 | -2.00% | 12 | 318.4 | 53.5 | 2 | 1 | 0 | | |
| 19965 | 10 | Case 125 | 0.9843 | 0.1777 | P | 0.92 | 0.86 | -1.70% | 5 | 318.7 | 56.5 | 1 | 0 | 0 | | |

Fig. 8

| Response Analysis | | | | | | Cohort Rank | | | | | | | | | | | |
|---|---|---|---|---|---|---|---|---|---|---|---|---|---|---|---|---|---|
| | | | Personae Options | | Case Number | | | | | | | | | | | | |
| | Show TC Cohorts | 3 | | A | Person ID | 4074 | 24164 | 750 | 22437 | 24372 | 133 | 29925 | 6209 | 25061 | 102213695 | | 727 |
| | with TC/Person ID= | | | B | 52.7 | 51 | 51 | 47 | 57 | 53 | 11 | 54 | 58 | 44 | 48 | 48 | |
| | displaying | Times | | | 58.4 | 60 | 66 | 63 | 64 | 66 | 18 | 51 | 51 | 61 | 64 | 68 | |
| | and highlighting | None | | C | 42.6 | 41 | 40 | 43 | 31 | 30 | 110 | 39 | 38 | 50 | 37 | 36 | |
| | Highlighted Person= | 133 | | D | 45.5 | 48 | 43 | 47 | 48 | 51 | 61 | 47 | 53 | 45 | 51 | 48 | |
| | Testing Center ID= | 3 | | | | | | | | | 0 | | | | | | |
| | | | | | | | | | 274 | | 64 | | | | | | |
| | | | | 1 | 110 | 142 | 141 | 139 | 138 | 136 | 136 | 134 | 134 | 125 | 125 | 124 | |
| Rank | Pos | Item ID | Content Description | | RaschOP ⊕ | 0.58 | 0.55 | 0.5 | 0.47 | 0.42 | 0.42 | 0.37 | 0.37 | 0.15 | 0.15 | 0.13 | |
| 2 | 167 | FP00010705 | ITEM CONTENT DESCRIPTION | | 0.83 | 34 | 32 | 41 | 57 | 43 | 9 | 61 | 73 | 81 | 14 | 40 | |
| 3 | 289 | FP00012148 | ITEM CONTENT DESCRIPTION | | 0.83 | 60 | 72 | 77 | 89 | 103 | 11 | 56 | 87 | 81 | 33 | 48 | |
| 4 | 195 | FP00012497 | ITEM CONTENT DESCRIPTION | | 0.83 | 37 | 87 | 39 | 44 | 47 | 9 | 0 | 135 | 148 | 46 | 32 | |
| 5 | 184 | FP00011889 | ITEM CONTENT DESCRIPTION | | 0.80 | 271 | 97 | 42 | 88 | 87 | 40 | 56 | 138 | 100 | 124 | 93 | |
| 6 | 110 | FP00008269 | ITEM CONTENT DESCRIPTION | | 0.78 | 39 | 79 | 124 | 67 | 121 | 6 | 54 | 204 | 121 | 66 | 23 | |
| 7 | 174 | FP00011265 | ITEM CONTENT DESCRIPTION | | 0.75 | 16 | 65 | 47 | 53 | 86 | 8 | 57 | 54 | 146 | 20 | 43 | |
| 8 | 152 | FP00010024 | ITEM CONTENT DESCRIPTION | | 0.73 | 68 | 19 | 29 | 21 | 25 | 7 | 27 | 51 | 56 | 25 | 41 | |
| 9 | 61 | FP00006575 | ITEM CONTENT DESCRIPTION | | 0.72 | 79 | 27 | 189 | 83 | 102 | 5 | 34 | 64 | 56 | 21 | 39 | |
| 10 | 68 | FP00006910 | ITEM CONTENT DESCRIPTION | | 0.72 | 173 | 59 | 86 | 43 | 21 | 5 | 43 | 85 | 190 | 61 | 68 | |
| 11 | 76 | FP00007389 | ITEM CONTENT DESCRIPTION | | 0.66 | 103 | 82 | 35 | 106 | 24 | 7 | 47 | 32 | 47 | 87 | 31 | |
| 12 | 58 | FP00006483 | ITEM CONTENT DESCRIPTION | | 0.65 | 75 | 66 | 25 | 272 | 115 | 5 | 176 | 48 | 79 | 53 | 35 | |
| 13 | 36 | FP00005591 | ITEM CONTENT DESCRIPTION | | 0.64 | 13 | 96 | 72 | 58 | 53 | 6 | 101 | 77 | 60 | 72 | 44 | |
| 14 | 41 | FP00005715 | ITEM CONTENT DESCRIPTION | | 0.63 | 40 | 88 | 52 | 128 | 52 | 2 | 72 | 83 | 58 | 79 | 59 | |
| 15 | 182 | FP00011818 | ITEM CONTENT DESCRIPTION | | 0.60 | 80 | 33 | 54 | 101 | 157 | 8 | 100 | 107 | 97 | 51 | 124 | |
| 16 | 120 | FP00008790 | ITEM CONTENT DESCRIPTION | | 0.60 | 108 | 93 | 186 | 14 | 129 | 9 | 31 | 70 | 145 | 69 | 63 | |
| 17 | 46 | FP00005903 | ITEM CONTENT DESCRIPTION | | 0.59 | 16 | 26 | 13 | 28 | 41 | 5 | 41 | 19 | 37 | 40 | 32 | |
| 18 | 83 | FP00007524 | ITEM CONTENT DESCRIPTION | | 0.58 | 32 | 32 | 101 | 67 | 39 | 12 | 35 | 62 | 219 | 97 | 43 | |
| 19 | 173 | FP00011264 | ITEM CONTENT DESCRIPTION | | 0.58 | 49 | 44 | 24 | 71 | 85 | 8 | 53 | 24 | 75 | 20 | 69 | |
| 20 | 27 | FP00005068 | ITEM CONTENT DESCRIPTION | | 0.56 | 169 | 159 | 100 | 87 | 59 | 50 | 31 | 60 | 66 | 79 | 29 | |
| 21 | 153 | FP00010087 | ITEM CONTENT DESCRIPTION | | 0.55 | 43 | 98 | 52 | 55 | 32 | 8 | 36 | 93 | 80 | 49 | 50 | |
| 22 | 177 | FP00011600 | ITEM CONTENT DESCRIPTION | | 0.53 | 58 | 36 | 28 | 40 | 44 | 10 | 71 | 74 | 37 | 9 | 32 | |
| 23 | 121 | FP00008905 | ITEM CONTENT DESCRIPTION | | 0.52 | 27 | 28 | 10 | 41 | 23 | 7 | 89 | 75 | 37 | 43 | 36 | |
| 24 | 129 | FP00009167 | ITEM CONTENT DESCRIPTION | | 0.52 | 22 | 176 | 49 | 45 | 123 | 8 | 79 | 92 | 50 | 27 | 55 | |
| 25 | 93 | FP00007712 | ITEM CONTENT DESCRIPTION | | 0.51 | 19 | 70 | 11 | 48 | 109 | 10 | 25 | 32 | 71 | 102 | 107 | |
| 26 | 139 | FP00009494 | ITEM CONTENT DESCRIPTION | | 0.51 | 125 | 79 | 43 | 49 | 158 | 81 | 140 | 105 | 91 | 691 | 64 | |

| ID | Test Center | Case | OP Theta (P/F) / PT Theta(P/F) | TAG 1 | New Comments | TAG 2 |
|---|---|---|---|---|---|---|
| 9509 | 5 | Case 1 | OP Theta= -1.0696 (F) / PT Theta= -0.1623 (P) | OK | | OK |
| 2766 | 8 | Case 795 | OP Theta= 0.6609 (P) / PT Theta= -0.2232 (P) | OK | | OK |
| 24645 | 6 | Case 796 | OP Theta= -0.3493 (P) / PT Theta= -0.3277 (P) | OK | | OK |
| 8729 | 5 | Case 797 | OP Theta= 0.2487 (P) / PT Theta= 0.461 (P) | OK | | OK |
| 133 | 3 | Case 798 | OP Theta= 0.4229 (P) / PT Theta= -0.9805 (F) | Harvest? | This candidate clearly passes on the OP items but clearly fails on the PT items. There is a big difference in rapid correct OP answers and rapid correct PT answers...looks like pre-knowledge. But it also looks like item harvesting? | PK? |
| 4179 | 6 | Case 799 | OP Theta= -0.8088 (F) / PT Theta= -0.1224 (P) | OK | | OK |
| 11627 | 5 | Case 800 | OP Theta= -0.2636 (P) / PT Theta= -0.5626 (P) | OK | | OK |
| 15205 | 5 | Case 801 | OP Theta= -0.7395 (F) / PT Theta= -1.0114 (F) | OK | | OK |
| 17332 | 5 | Case 802 | OP Theta= -0.6025 (P) / PT Theta= -0.1399 (P) | OK | | OK |
| 7265 | 4 | Case 803 | OP Theta= 1.3673 (P) / PT Theta= 0.3721 (P) | OK | | OK |
| 27220 | 8 | Case 804 | OP Theta= -0.3088 (P) / PT Theta= -0.4341 (P) | OK | | OK |

Fig. 10

| ID | Test Center | Case | OP AM (P/F) / PM Theta(P/F) | TAG 1 | TAG 2 | New Comments | TAG 3 | Proxy FLAGS | PM DPF t-test | Prob | AM DPF t-test | Prob |
|---|---|---|---|---|---|---|---|---|---|---|---|---|
| 9509 | 5 | Case 1 | AM Theta=-1.4214 (F) / PM Theta= -0.7357 (F) | OK | OK | | OK | | 1.90 | 0.06 | -1.89 | 0.06 |
| 9584 | 6 | Case 2 | AM Theta=-1.5288 (F) / PM Theta= -0.4625 (P) | OK | OK | | OK | AM-PM ThetaT-Test (-3.01 p=0.003) | 2.36 | 0.02 | -2.38 | 0.02 |
| 6909 | 6 | Case 3 | AM Theta=-0.8353 (F) / PM Theta= -0.5528 (P) | OK | OK | | OK | | 0.61 | 0.55 | -0.61 | 0.54 |
| 28933 | 8 | Case 4 | AM Theta=-0.4283 (P) / PM Theta= 0.4176 (P) | OK | OK | | OK | | -0.20 | 0.84 | 0.20 | 0.84 |
| 18963 | 3 | Case 5 | AM Theta=-1.0226 (F) / PM Theta= -1.4328 (F) | OK | OK | | OK | | -0.61 | 0.55 | 0.60 | 0.55 |
| 9912 | 10 | Case 6 | AM Theta=-0.5884 (P) / PM Theta= 0.1754 (P) | OK | OK | | OK | | 0.52 | 0.60 | -0.53 | 0.60 |
| 8468 | 1 | Case 7 | AM Theta=-0.8816 (F) / PM Theta= 0.1754 (P) | OK | OK | | OK | Lo-AM-Hi-PM THETA (-0.8816, 0.1754) AM-PM T-Test (-3.08 p=0.002) | | | | |
| 5606 | 10 | Case 8 | AM Theta=-1.584 (F) / PM Theta= -1.4328 (F) | OK | OK | | OK | | 2.52 | 0.01 | -2.53 | 0.01 |
| 13442 | 9 | Case 9 | AM Theta=1.4472 (P) / PM Theta= 0.788 (P) | OK | OK | | OK | | 0.64 | 0.52 | -0.64 | 0.52 |
| 7105 | 6 | Case 10 | AM Theta=1.6405 (F) / PM Theta= -0.7357 (F) | OK | OK | | OK | | -1.16 | 0.25 | 1.17 | 0.25 |
| 27040 | 5 | Case 547 | AM Theta=1.0058 (P) / PM Theta= 0.9641 (P) | OK | OK | | OK | | 1.51 | 0.13 | -1.49 | 0.14 |
| 14424 | 7 | Case 7 | AM Theta=-1.1187 (F) / PM Theta= -0.3724 (P) | OK | OK | | OK | | -0.34 | 0.74 | 0.35 | 0.73 |
| 16177 | 2 | Case 7 | AM Theta=-0.2445 (P) / PM Theta= -0.3724 (P) | OK | OK | | OK | | 1.67 | 0.10 | -1.67 | 0.10 |
| 212 | 9 | Case 7 | AM Theta=-1.4746 (F) / PM Theta= 1.3689 (P) | OK | OK | AM Theta vs. DPF PM T-Test scatter plot. This and one other candidate are so far from the other candidates that they are very obvious on the scatter plot. | Proxy? | Lo-AM-Hi-PM THETA (-1.4746, 1.3689) DPF PM T-Test (5.17 p=0) AM-PM Theta T-Test (-7.07 p=0) | -0.60 | 0.55 | 0.61 | 0.55 |
| | | | | | | | | | 5.17 | 0.00 | -5.16 | 0.00 |

Fig. 11

| Order | ID | Case | Testing Center | OP θ | PF | Response Flags | Time Flags | PK Flags | Proxy | Tag 1 | Tag 2 | Tag 3 | Comments | Final Decision | EGGS |
|---|---|---|---|---|---|---|---|---|---|---|---|---|---|---|---|
| 1 | 133 | Case 798 | 3 | 0.4229 | P | | SHORT(67.5) RAP (170<=10s) | HI-Lo-Theta (OP=0.4229, PT=0.9805) D-RAP-Correct (0.485) DPF PT T-TEST (-3.28 p=0.002) OP-PT Theta T-Test (3.26p=0.002) | | Harvest? | PK? | OK | Very short testing session and 170 responses under 10 seconds. Probably not engaged in legitimate test taking; but what is going on? This candidate clearly passes on the OP items but clearly fails on the PT items. There is a big difference in rapid correct OP answers and rapid correct PT answers...looks like pre-knowledge. But it also looks like item harvesting? | Harvest? | IH4-test scout...starts out legit then does inefficient thief |
| 2 | 212 | Case 550 | 3 | -0.15 | P | | | | Lo-AM-Hi-PM THETA(-1.4746 -1.3689) DPF PM T-Test (-7.07 p=0) | OK | OK | Proxy? | See AM Theta vs. DPF PM T-Test scatter plot. This and one other candidate are so far from the other candidates that they are very obvious on the scatter plot. | Proxy? | Proxy-Low candidate front end; High at back |
| 3 | 423 | Case 1036 | 3 | -0.2183 | P | | LONG(424.5) | HI-Lo-Theta (OP=0.2183, PT=-2.7005) DPF PT T-TEST (-3.1 p=0.003) OP-PT Theta T-Test (3.54 p=0.001) | | OK | PK? | OK | This candidate clearly passed based on the operational items but failed decisively based on the pretest items. The magnitude of differential p-erson functioning is such that only 3 values of this magnitude would be expected by chance in 1000 cases. | PK? | PreKnow7- Collusion seen the whole test some incongruous misses on easy items |

Fig. 12

| ID | Status | Area | Comp | SubComp | Key | PT Form | AM/PM | Bank p+ | Rasch | SE | Infit | Outfit | Displace | PME | Mean Time | Unexp Right | Unexp Wrong |
|---|---|---|---|---|---|---|---|---|---|---|---|---|---|---|---|---|---|
| FP00000778 | OP | 4 | 4J | 4J02 | D | | PM | 0.783 | -1.5100 | 0.0761 | 1.07 | 1.14 | 0.08 | 0.2300 | 44.67 | 0.000% | 13.283% |
| FP00000960 | OP | 4 | 4C | 4C02 | D | | PM | 0.497 | 0.1700 | 0.0665 | 0.87 | 0.86 | 0.20 | 0.4700 | 69.70 | 2.846% | 0.474% |
| FP00002117 | OP | 3 | 3C | 3C01 | A | | PM | 0.713 | -0.9800 | 0.0691 | 1.15 | 1.18 | 0.43 | 0.3100 | 82.52 | 0.000% | 8.918% |
| FP00002305 | OP | 1 | 1A | 1A01 | B | | AM | 0.677 | -0.5500 | 0.0662 | 0.88 | 0.86 | 0.12 | 0.4900 | 56.26 | 0.189% | 1.799% |
| FP00002580 | OP | 4 | 4B | 4B03 | B | | PM | 0.638 | -0.4700 | 0.0660 | 1.07 | 1.09 | -0.28 | 0.2000 | 80.78 | 0.095% | 3.700% |
| FP00002676 | OP | 4 | 4E | 4E03 | C | | PM | 0.490 | 0.1300 | 0.0664 | 1.09 | 1.09 | -0.07 | 0.2500 | 46.12 | 4.175% | 0.380% |
| FP00002716 | OP | 3 | 3A | 3A04 | C | | PM | 0.591 | 0.0200 | 0.0660 | 1.05 | 1.05 | -0.52 | 0.3400 | 40.94 | 2.562% | 1.139% |
| FP00002725 | OP | 1 | 1B | 1B02 | B | | AM | 0.381 | 0.4900 | 0.0685 | 0.92 | 0.94 | 0.27 | 0.3500 | 90.08 | 6.439% | 0.379% |
| FP00002865 | OP | 3 | 3C | 3C07 | B | | PM | 0.530 | 0.0400 | 0.0661 | 0.97 | 0.96 | 0.30 | 0.3600 | 90.81 | 1.803% | 0.949% |

| Count= | 10 | n | %HI (Total)/CUT | Top 1%OP ⊖/CUT | Top 5%OP ⊖/CUT | 4th Q OP ⊖/UB | 3rd Q OP ⊖/UB | 2nd Q OP ⊖/UB | 1st Q OP ⊖/UB | Harvest? | PK? | Collusion? | Proxy? | Pass Rate/CUTSCC |
|---|---|---|---|---|---|---|---|---|---|---|---|---|---|---|
| | TOTAL | 1057 | 1.04% | 1.23% | 5.11% | 24.98% | 24.98% | 24.69% | 25.35% | | | | | 68.78% |
| | | | 211.44 | 1.8637 | 1.2547 | 2.1616 | 0.3723 | -0.3088 | -0.7395 | | | | | -0.62526 |
| Order | Testing Center | | | | | | | | | | | | | |
| 1 | 1 | 58 | 1.7% | 3.4% | 6.9% | 27.6% | 29.3% | 19.0% | 24.1% | 1 | 1 | | | 68.97% |
| 2 | 2 | 134 | 0.7% | 1.5% | 6.0% | 26.1% | 17.9% | 32.1% | 23.9% | | | | | 70.15% |
| 3 | 3 | 118 | 1.7% | 1.7% | 6.8% | 24.6% | 31.4% | 19.5% | 24.6% | 1 | 1 | | | 72.88% |
| 4 | 4 | 113 | 0.0% | | 4.4% | 19.5% | 26.5% | 27.4% | 26.6% | | | | | 65.49% |
| 5 | 5 | 137 | 0.7% | 1.0% | 4.4% | 26.7% | 22.2% | 23.7% | 27.4% | | | | | 65.19% |
| 6 | 6 | 100 | 1.0% | | 4.0% | 24.0% | 28.0% | 20.0% | 28.0% | | | | | 70.00% |
| 7 | 7 | 100 | 0.0% | | 5.0% | 25.0% | 21.0% | 29.0% | 25.0% | | | 0 | | 67.00% |
| 8 | 8 | 112 | 0.9% | 0.9% | 4.5% | 25.0% | 24.1% | 25.9% | 25.0% | | | | | 67.86% |
| 9 | 9 | 128 | 2.3% | 3.1% | 5.5% | 24.2% | 28.9% | 25.0% | 21.9% | | | | 1 | 71.88% |
| 10 | 10 | 59 | 1.7% | 1.7% | 5.1% | 30.5% | 22.0% | 18.6% | 28.8% | | | | | 67.80% |

OUTLIER DETECTION TOOL

RELATED APPLICATIONS

This patent claims priority to U.S. Provisional Application 61/602,882, filed Feb. 24, 2012, which is hereby incorporated by reference for all purposes. This application is also related to U.S. patent application titled TEST PALLET ASSEMBLY AND FAMILY ASSIGNMENT, Ser. No. 13/774,608 owned by a common assignee of this application and filed on the same day as this application, which is also incorporated by reference herein for all purposes.

TECHNICAL FIELD

This patent is directed to a tool for identifying credentialing test score outliers and anomalous candidate behavior. More particularly, the tool is directed to identification of test subjects that appear to be cheating or taking the test for the purpose of promoting cheating.

BACKGROUND

Testing to determine capability in a particular field has long been of interest. Testing is used in virtually all areas of academics, enterprise and government to evaluate candidates seeking certification in certain professional capacities, including real estate, law, medicine, etc. As in any testing environment, attempts to achieve an unfair advantage, or to profit from capturing information about such a test, are a reality.

Examples of attempts to achieve an unfair advantage include pre-knowledge, that is, gaining access to test items (e.g., questions) before the beginning of a test, proxy testing, a situation where a person represents himself or herself as being another person during the test, and item harvesting, the intent to capture test content for the purpose of distribution to later test takers.

Test developers or psychometricians routinely analyze both operational items (questions that contribute towards a candidate's score) and pretest items (field questions that do not contribute towards a candidate's score). A primary purpose of analyzing operational items is to verify the key, or correct answer, to questions prior to computing and reporting scores. Pretest items are similarly analyzed in order to assess item quality for possible inclusion on future exams. In addition to these routine analyses, operational and pretest response data can also be analyzed to assess possible threats to the security and therefore, integrity, of the exam. This line of analysis is commonly referred to as "outlier detection," and is a subarea of a larger topic, "data forensics."

SUMMARY

A unified outlier detection tool allows entry of test scores from a number of test instances, for example, scores from tests administered at different facilities, and further allows a reviewer to examine the test data for a number of suspicious pre-defined indications and flag corresponding instances for further follow up. The tool also allows identification of unexpected test item responses with respect to both operational and pretest items.

The tool allows automatic and systematic identification of anomalous records for closer examination, and to subsequently identify instances of potential test item harvesting, pre-knowledge, and proxy test taking.

BRIEF DESCRIPTION OF THE DRAWINGS

FIG. 4 is an exemplary test data input area;

FIG. 8 illustrates an exemplary initial results screening area;

FIG. 9 illustrates an exemplary test record summary area;

FIG. 10 illustrates an exemplary test record detail area showing results for harvest and pre-knowledge screening;

FIG. 11 illustrates an exemplary test record detail area showing results for proxy screening;

FIG. 12 illustrates an exemplary summary results area showing a compilation of screening results;

FIG. 13 illustrates an exemplary form showing test item descriptive data;

FIG. 14 illustrates an exemplary summary results form by test center;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
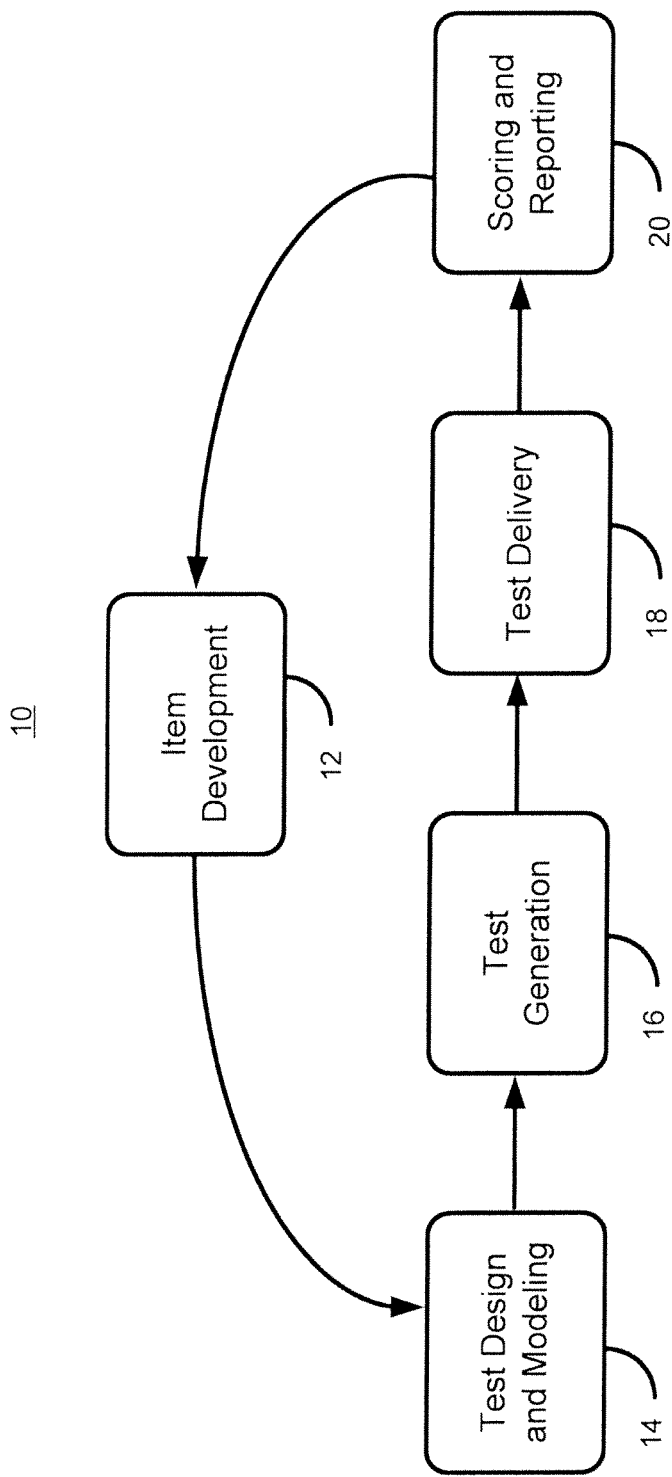
FIG. 1 illustrates a representative testing cycle.

FIG. 1 illustrates a representative testing cycle 10. The testing cycle 10 involves development of test items 12, that is, individual questions or other items requiring a response from a test subject. Using the test items 12, a test may be designed 14 to meet certain requirements of the test client. As discussed above, some tests may be targeted at ascertaining a test subject's level against a certain metric, such as grade level in reading. Other tests may be targeted at determining a test subject's latent ability at a given pass/fail test cut point. Tests may be generated 14 according to the goals of the test and the presentation of test items. Some tests may be set in a predetermined order, such as a paper test, or test items may be presented to a test subject at an order determined during the administration of the test, as in an adaptive or dynamic test. After the test is administered 18, a scoring and reporting process 20 is performed to notify the test client of the scores, to rate scored and pre-test test items, to screen for abnormal test results, etc. The exemplary embodiments described here are, for the sake of simplicity but without limitation, directed to pass/fail testing, such as a board test for professional licensing.

Figure 2:
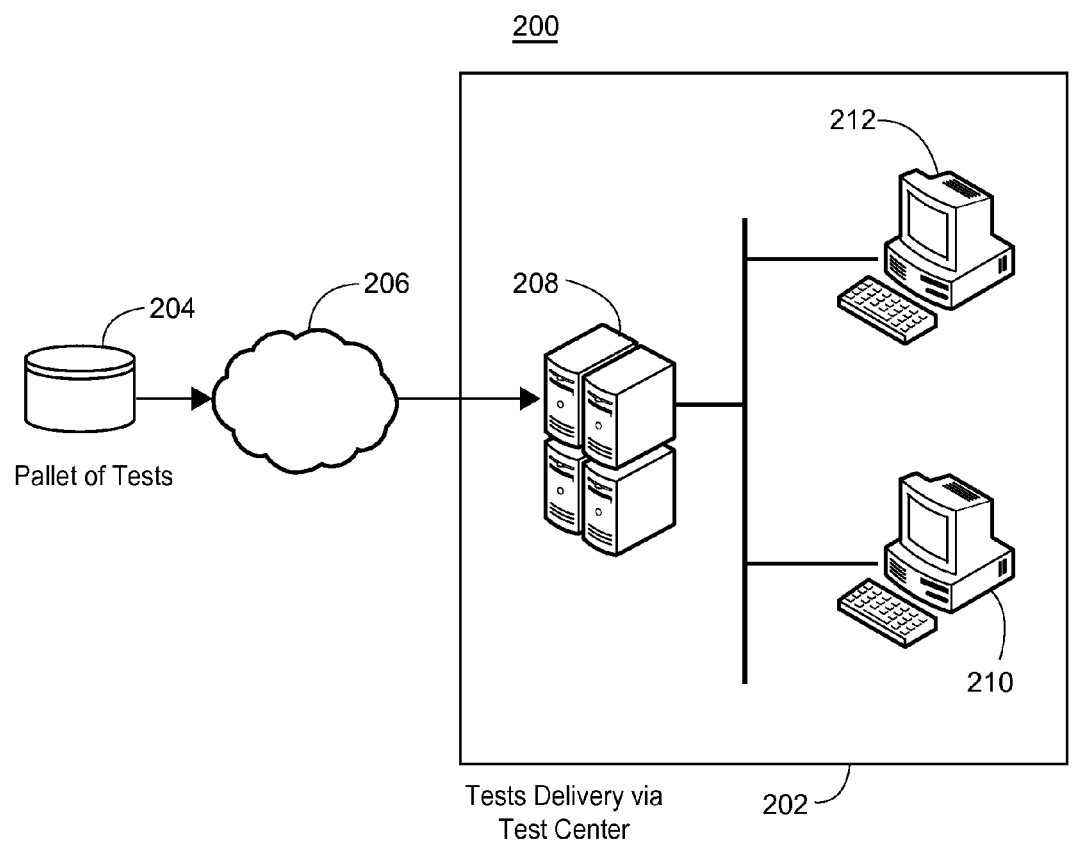
FIG. 2 is a block diagram of an exemplary test delivery system.

The remainder of the discussion in this patent generally corresponds to activities associated with block 20 of FIG. 1. FIG. 2 is a block diagram of an exemplary test delivery system 200. In an exemplary embodiment, a collection of individual test forms, called a pallet 204, may be delivered via a network 206, such as the Internet, to a testing center 202. Each test form is composed of a number of test items. A test item is an individual item requiring a response, such as, but not limited to, a question. Test items may include text, graphics, images, videos, etc. At the testing center 202, individual test forms may be used by test subjects at testing workstations 210, 212. Alternatively, as is known in the art, a set of test items larger than the number of test items delivered to an individual test subject (not depicted) may be delivered to the testing center 202 and an individual test may be administered in an adaptive manner by presenting succeeding items based on previous responses by the test subject. The form of test delivery is not relevant to the function of the outlier identification tool described herein.

Figure 3:
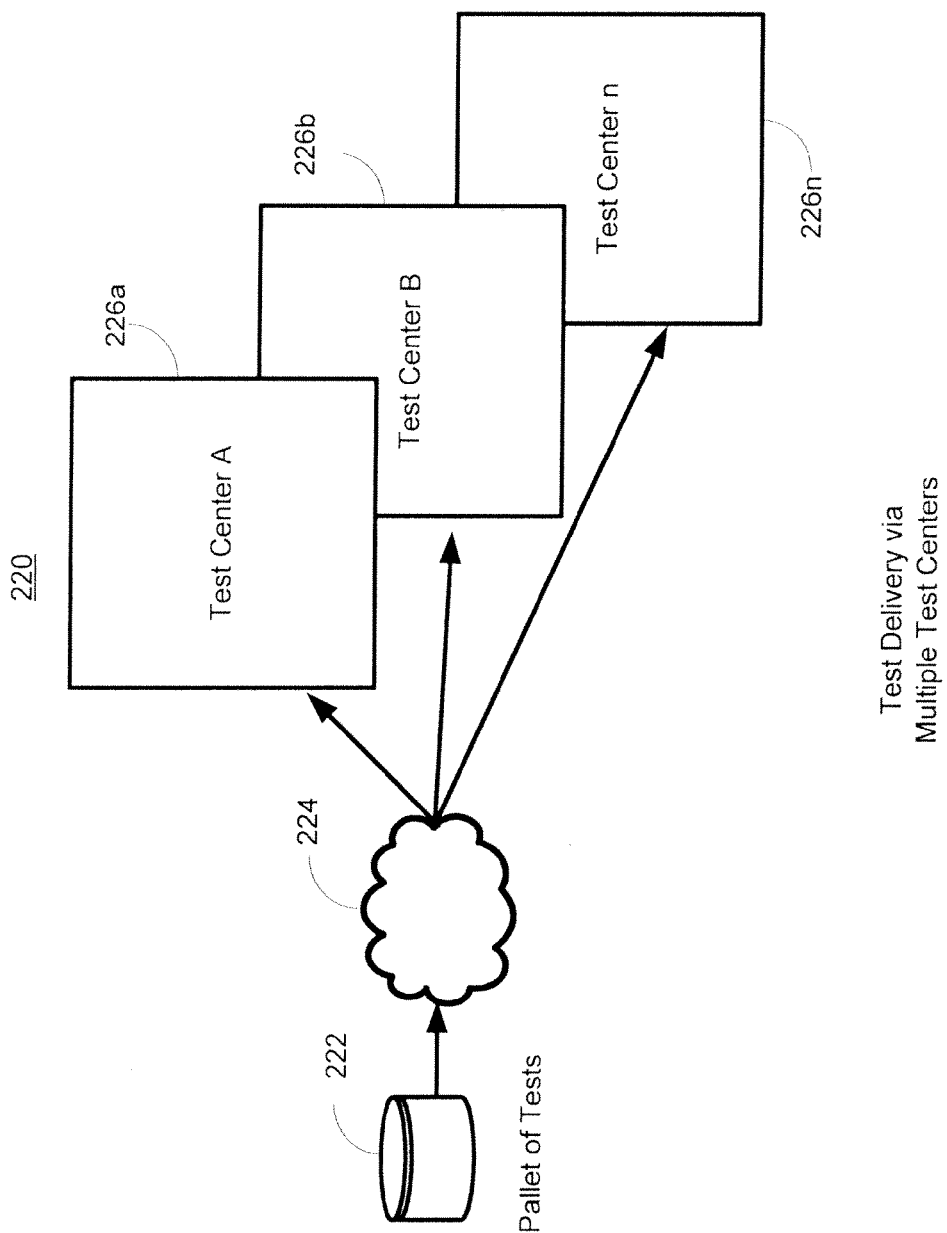
FIG. 3 is a block diagram of a second exemplary test delivery system.

FIG. 3 is a block diagram of a second exemplary test delivery system 220 illustrating that a pallet of tests 222, made up of individual test forms or a set of test items may be delivered via a network 224 to a number of test centers 226a-226n. As discussed further below, the outlier detection tool supports analysis of test results for the same or similar tests delivered at multiple facilities.

The outlier test tool may be embodied as a program or program modules stored on a computer memory and executed on a computer. In an exemplary embodiment, the outlier test tool may be implemented using a computer-based spreadsheet program, such as, but without limitation to, Microsoft® Excel®.

For the sake of illustration of an embodiment of the outlier detection tool, representative forms are used to show data input and results tabulations.

FIG. 4 illustrates an exemplary test results input area and shows a portion of a test data input area 230. In the exemplary embodiment the input data fields include statistical results information by test subject (entry). Additional information including response by test item may be captured in this or a similar form (not depicted). In an embodiment, raw test results data may be pre-processed to develop Rasch measures using, for example, a tool such as Winsteps®. In the Rasch model, the probability of a specified response (e.g. right/wrong answer) is modeled as a function of person and item parameters. Specifically, in the simple Rasch model, the probability of a correct response is modeled as a logistic function of the difference between the person and item parameter. In most contexts, the parameters of the model pertain to the level of a quantitative trait possessed by a person or item. For example, test item parameters pertain to the difficulty of test items while person parameters pertain to the ability or attainment level of people who are assessed. The higher a person's ability relative to the difficulty of an item, the higher the probability of a correct response on that item.

Figure 5:
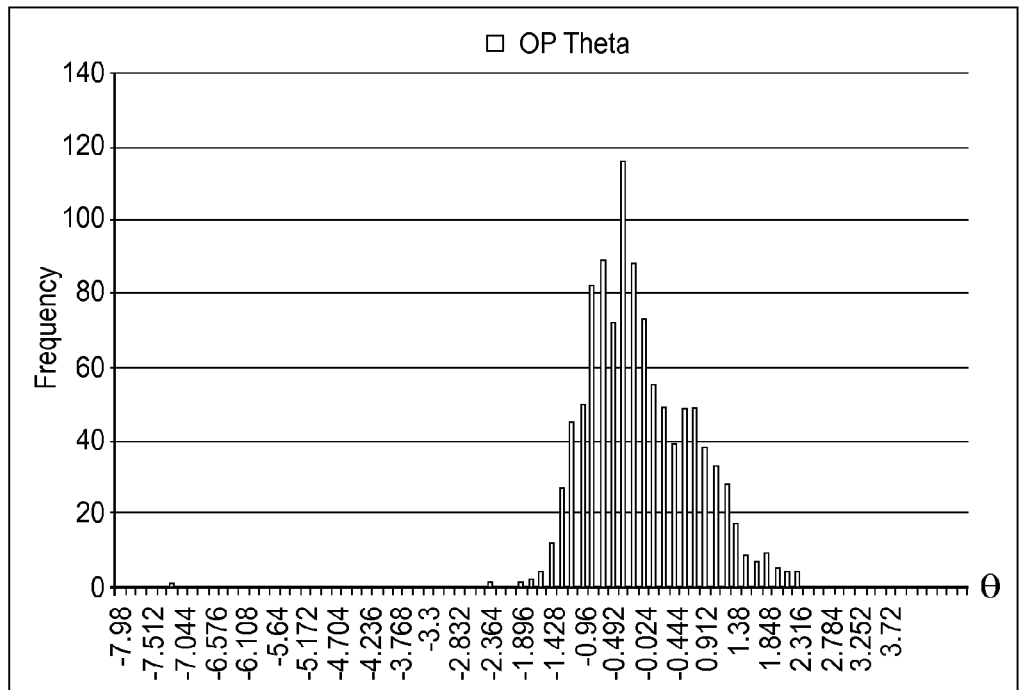
FIG. 5 is a graph showing exemplary test result distribution.

In preparation for selection of screening criteria, discussed below, a representative embodiment may present charts of various data so that the outlier detection tool operator can make an informed decision about where to set cut off points for various available criteria. These representative charts may be generated using standard techniques, such as programming macros, available in the base spreadsheet or similar program. FIG. 5 illustrates combined Operational (OP) test item theta 240. Theta in this context represents a test subject's latent ability corresponding to a center value of test item ratings. OP Theta is the test subject's performance on test items designated as operational, or scored test items. Other test items may be designated as Pre-test (PT). Pre-test items are those test items presented for the first time to test subjects and are not used in the computation of subjects' operational scores. The pre-test items are evaluated based on responses received as to their value in use as operational items in future tests. The graph of FIG. 5 may be used to set an OP Theta value for flagging as being atypical and worthy of further inspection.

Figure 6:
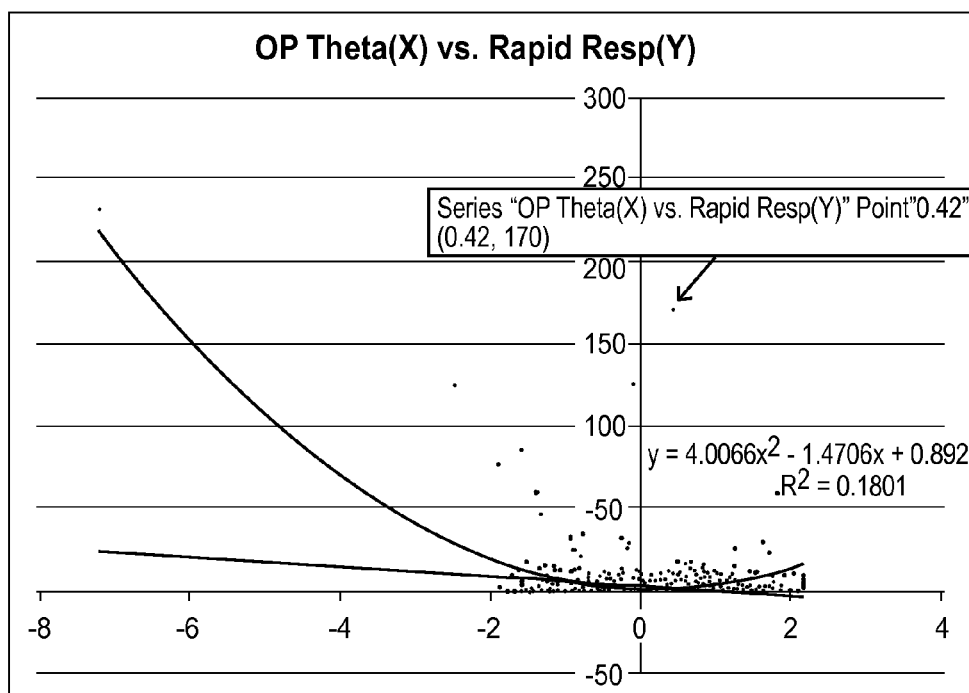
FIG. 6 is a graph showing an exemplary scatter chart of two test factors.

FIG. 6 is a graph showing an exemplary scatter chart 242 of OP Theta vs. test subject average response time (so called Rapid Response). The scatter chart 242 highlights candidate scores (latent ability) compared to the number of extremely rapid item responses produced by each. In an embodiment, hovering over a particular item may produce a pop up 244 showing the values for the individual graph point. The x-y coordinates may be used in a look-up function to identify the test subject identifier corresponding to that data point.

Figure 7:
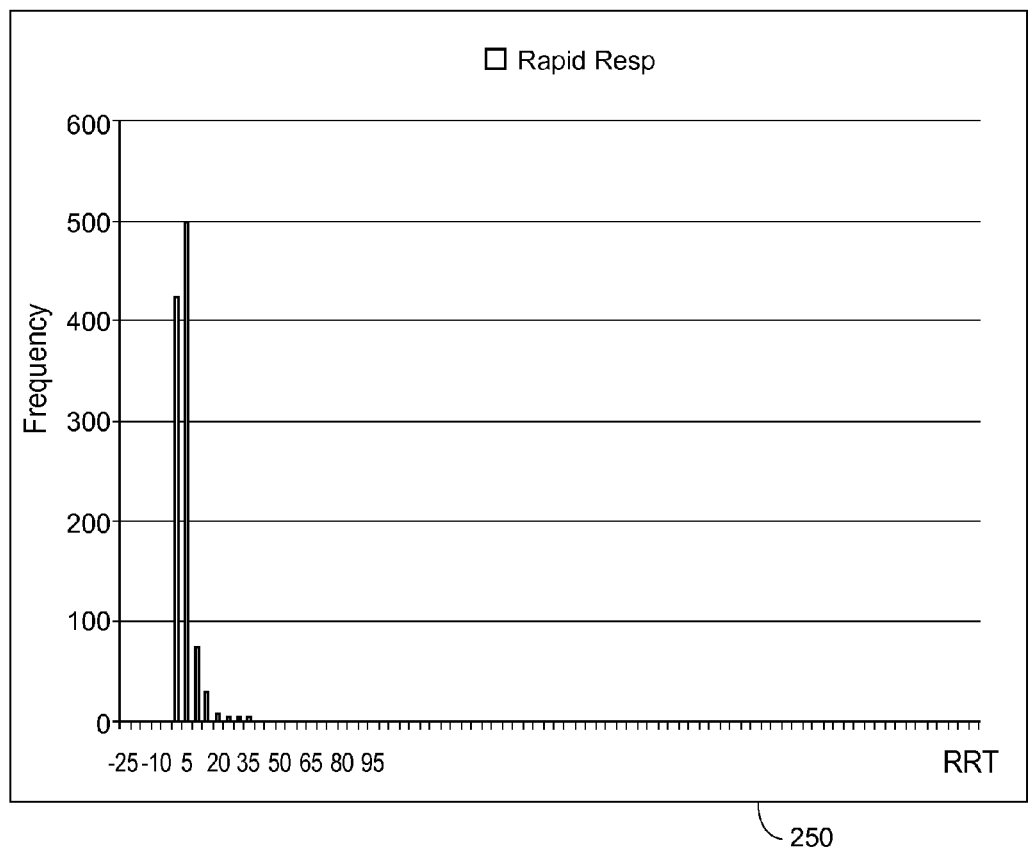
FIG. 7 is a graph showing exemplary distribution of anomalous item response times.

FIG. 7 is an exemplary graph showing an exemplary distribution of extremely rapid response times. The information may be used as described below with respect to Table 1 to select screening criteria values to set up automatic outlier flagging.

Table 1 below illustrates representative screening criteria, as found for example, on an exemplary screening criteria entry area of the outlier detection tool. The individual criteria may vary according to test type and preference. The values shown are for example only. An element of the outlier detection tool is the ability to vary the values based on an initial analysis of the results in summary graphs illustrated in FIGS. 5-7. Each column of values, that is "Value," "Percent Rank," and "Percentile" may each be designated independently, allowing complex selection of screening criteria based not only on an individual test result, but also the test result in comparison with the other test results in the result set.

TABLE 1

| Outlier Flagging Criteria | Value | % Rnk | % ile |
|---|---|---|---|
| Total Raw Scores | | | |
| A. The top X % of TOTAL SCORES will be considered HIGH. X = | 1.00% | 99.00% | 211.44 |
| B. The bottom X % of TOTAL SCORES will be considered LOW. X = | 1.00% | 1.00% | 66 |
| Person Rasch Measures | | | |
| A. The top X % of OPERATIONAL RASCH MEASURES will be considered HIGH. X = | 55.00% | 45.00% | −0.3766 |
| B. The bottom X % of OPERATIONAL RASCH MEASURES will be considered LOW. X = | 45.00% | 45.00% | −0.3766 |
| A. The top X % of PRETEST RASCH MEASURES will be considered HIGH. X = | 45.00% | 55.00% | −0.1203 |
| B. The bottom X % of PRETEST RASCH MEASURES will be considered LOW. X = | 55.00% | 55.00% | −0.1203 |
| Misfitting Responses | | | |
| A. The top X % of INFIT VALUES will be considered outliers. X = | 0.50% | 99.50% | 1.200 |
| A. The top X % of OUTFIT VALUES will be considered outliers. X = | 1.00% | 99.00% | 1.374 |
| Unexpected Responses | | | |
| A. Item RESPONSES that have ≤ X % probability of occurring given the item difficulty and the person's ability will be considered HIGHLY UNEXPECTED. X = | 15.00% | | |
| A. STANDARDIZED RESIDUALS between the observed and expected item scores given item difficulty and person ability will be considered MISFITTING if their absolute values are greater than X. X = | 1.95 | | |
| B. The top X % of HIGHLY UNEXPECTED RESPONSE COUNTS will be considered outliers. X = | 1.00% | 99.00% | 33.000 |
| Randomness in Responding | | | |
| A. A difference of at least X % between the % of MODEL MATCHING RESPONSES EXPECTED and the % of MODEL MATCHING RESPONSES OBSERVED will be considered HIGHLY RANDOM. X = | 10.00% | | |
| Total Test Time | | | |
| A. The top X % of TOTAL TESTING TIMES (min) will be considered LONG. X = | 0.75% | 99.25% | 342.5 |
| B. The bottom X % of TOTAL TESTING TIMES (min) will be considered SHORT. X = | 0.65% | 0.65% | 115.4 |
| Item Response Times | | | |
| A. An ITEM RESPONSE TIME of X seconds or more will be considered SLOW. X = | 500 | | |
| A. An ITEM RESPONSE TIME of X seconds or less will be considered RAPID. X = | 10 | | |
| B. The top X % of SLOW RESPONSE TIME COUNTS will be considered outliers. X = | 0.10% | 99.90% | 4.0 |
| B. The top X % of RAPID RESPONSE TIME COUNTS will be considered outliers. X = | 1.10% | 98.90% | 39.6 |
| Omitted Responses | | | |
| A. The top X % of OMITTED RESPONSE COUNTS will be considered outliers. X = | 0.80% | 99.20% | 7.7 |
| Pre-Knowledge Flagging Criteria | | | |
| A. The top X % of PERCENTAGEs OF OP ITEMS WITH MISFITTING CORRECT ANSWERS will be considered outliers. X = | 0.00% | 100.00% | 12.5% |
| A. The top X % of DELTAS between % of OP MISFITTING CORRECT ANSWERS and % of PT MISFITTING CORRECT ANSWERS will be considered outliers. X = | | | |
| A. The bottom X % of PERCENTAGEs OF OP ITEMS WITH MISFITTING INCORRECT ANSWERS will be considered outliers. X = | | | |
| A. The bottom X % of DELTAS between % of OP MISFITTING INCORRECT ANSWERS and % of PT MISFITTING INCORRECT ANSWERS will be considered outliers. X = | | | |
| 23. The top X % of PERCENTAGEs OF OP ITEMS with RAPID CORRECT ANSWERS will be considered outliers. X = | 0.90% | 99.10% | 9.0% |
| 24. The top X % of DELTAs between % of OP ITEMS with RAPID CORRECT ANSWERS and the % of PT ITEMS with RAPID CORRRECT ANSWERS will be considered outliers. X = | 0.20% | 99.80% | 26.9% |

TABLE 1-continued

| Outlier Flagging Criteria | Value | % Rnk | % ile |
|---|---|---|---|
| 25. The top X % of PERCENTAGEs of OP ITEMS with MISFITTING, RAPID, CORRECT ANSWERS will be considered outliers. X = | | | |
| 26. The top X % of DELTAs between % of OP ITEMS with MISFITTING, RAPID, CORRECT ANSWERS and % of PT ITEMS with MISFITTING, RAPID, CORRECT ANSWERS will be considered outliers. X = | | | |
| 27. The bottom X % of DIFFERENTIAL PERSON FUNCTIONING T-TEST VALUES with the focus on PT items (persons measure lower on pretest items than on operational items) will be considered outliers. X = | 3.50% | 3.50% | −2.58 |
| 28. The top X % of ADJUSTED T-TESTS BETWEEN OP Theta and PT Theta will be considered outliers. X = | 3.20% | 96.80% | 2.59 |
| Proxy Flagging Criteria | | | |
| 29. The top X % of AM OPERATIONAL THETA VALUES will be considered HIGH. X = | 46.00% | 54.00% | −0.27908 |
| 30. The bottom X % of AM OPERATIONAL THETA VALUES will be considered LOW. X = | 54.00% | 54.00% | −0.27908 |
| 31. The top X % of PM OPERATIONAL THETA VALUES will be considered HIGH. X = | 55.00% | 45.00% | −0.2825 |
| 32. The bottom X % of PM OPERATIONAL THETA VALUES will be considered LOW. X = | 45.00% | 45.00% | −0.2825 |
| 33. The top X % of DIFFERENTIAL PERSON FUNCTIONING T-TEST VALUES with the focus on PM items (persons measure higher on PM items than on AM items) will be considered outliers. X = | 0.30% | 99.70% | 3.456096 |
| 34. The top X % of DIFFERENTIAL PERSON FUNCTIONING T-TEST VALUES with the focus on AM items (persons measure higher on AM items than on PM items) will be considered outliers. X = | 0.10% | 99.90% | 2.905968 |
| 35. The top X % of ADJUSTED T-TESTS BETWEEN AM OP Theta and PM OP Theta will be considered outliers. X = | 0.30% | 99.70% | 3.04615 |
| 35. The bottom X % of ADJUSTED T-TESTS BETWEEN AM OP Theta and PM OP Theta will be considered outliers. X = | 3.00% | 3.00% | −3 |

FIG. 8 illustrates an exemplary initial results screening area 260. Statistical data corresponding to each test subject may be displayed in rows as illustrated. Items relating to flagged results corresponding to entries such as those designated in Table 1, above, may be automatically displayed using conditional results from a comparison of screening criteria and actual results. For example, randomness in results 262 is flagged, short overall test length 264, and others as depicted. A reviewer can then note these test subjects, for example, by ID as successive results are considered.

FIG. 9 illustrates an exemplary test record summary area 270, showing test items 272 vertically and by test subject 274 horizontally. In this exemplary embodiment, test items are ordered by difficulty (Rasch score) and test subjects are ranked by OP Theta. Records will also be flagged 276 if there are a greater proportion of rapid correct operational test responses than rapid correct pretest responses, etc. In an embodiment, a statistical analysis measure, such as a Fisher Exact Test utility, may be used to allow the user to more closely examine patterns in the relationships between two variables, such as rapid responses and correct responses. The use of such a tool will give a probability value to any observed unbalanced relationships between variables (e. g., the probability that the observed relationship between rapid correct and incorrect answers or other relationship, would happen by chance).

FIG. 10 illustrates an exemplary test record detail area 280 showing results for harvest and pre-knowledge screening. Tags (Tag 1 and Tag 2) columns are driven by comparisons of screening criteria and test results and outliers are automatically flagged 284. Harvest flags are driven by test times, particularly on individual questions that are not commensurate with the rest of the group. The presumption is that a person attending only to appropriate the test items and response alternatives will not be concerned with deliberating over a correct response but will simply move through the material without regard for the response. Referring back to FIG. 9, Case Number 798, Person ID 133, selected response C a disproportionate 110 times. Returning to FIG. 10, Person ID 133 is also flagged as having statistically significant better responses on OP test items that have appeared on other tests than PT test items making their first appearance, leading to suspicion of having pre-knowledge. Reviewer comments 282 may be entered and transferred to a summary page, discussed below.

FIG. 11 illustrates an exemplary test record detail area 290 showing results for proxy screening. Proxy screening characterizes test results between morning (AM) and afternoon (PM) sessions of a test, when two different people may attend the separate sessions. Proxy screening compares AM and PM Theta scores and flags those test subjects whose score differences exceed the proxy flagging criteria illustrated in Table 1.

FIG. 12 illustrates an exemplary summary results area 320 showing a compilation of screening results. The summary results area 320 shows a compilation of test subjects for whom flags 322 have been raised, previously entered comments, and a reviewer's final status determination 324.

FIG. 13 illustrates an exemplary form showing test item descriptive data 340. This information may be input along with test results data prior to screening with the outlier detection tool. In an embodiment, the test item descriptive data 340 may be generated using the Winstep® tool.

FIG. 14 illustrates an exemplary summary results form by test center 350. Here each test center participating in a particular test run is shown with a summary of suspected anomalous behavior as well as an overall pass rate. This data allows a reviewer to observer patterns by test center to see if a particular site may be the target of an attack or may have another issue associated with overall testing integrity.

Figure 15:
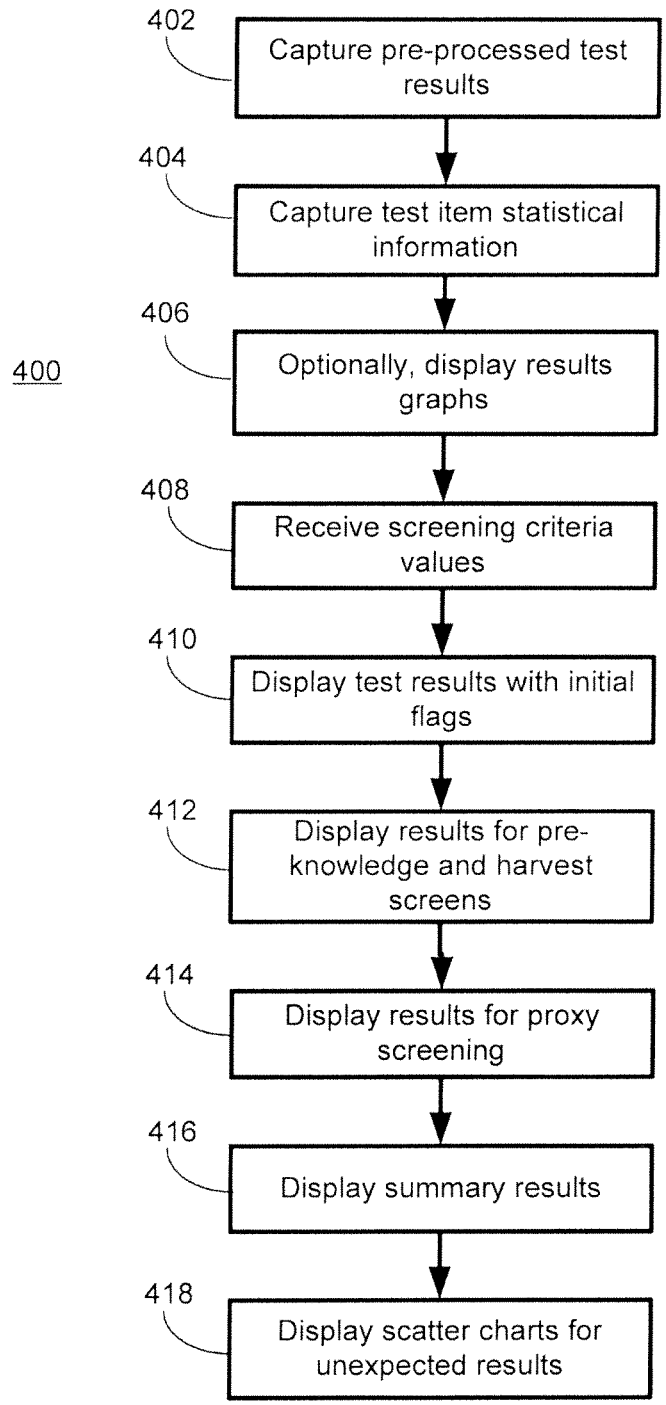
FIG. 15 is an exemplary method of using an outlier detection tool.

FIG. 15 is a flow chart of an exemplary method 400 of using of an outlier detection tool. Initially, use of the outlier detection tool may begin by capturing pre-processed test results. As shown with respect to FIGS. 4 and 17 and as discussed above, various items related to a particular test may be entered, including test results by test item (block 402) and test subject as well as test item information (block 404). Other identifying information, such as test dates and locations may also be included.

A display of various results in graphical form (block 406) may be presented for use by a reviewer in selecting screening criteria values. Screening criteria values may be entered (block 408) and used in calculation of various item flags as discussed below.

A first results area may be displayed (block 410) showing initial tabular results with items meeting screening criteria values flagged for review. A second results area may be displayed (block 412) showing test results with items flagged meeting pre-knowledge screening criteria and test harvest screening criteria. A third results area may be displayed (block 414) showing test results with items flagged meeting test proxy screening criteria.

A summary results area may be displayed (block 416) showing a summary of test results including previously flagged items meeting screening criteria and corresponding reviewer comments made in the first and second results areas.

Corresponding to specific test item metrics, scatter charts for unexpected correct and unexpected incorrect responses to test items may be displayed (block 418) for use in analyzing test item suitability.

Figure 16:
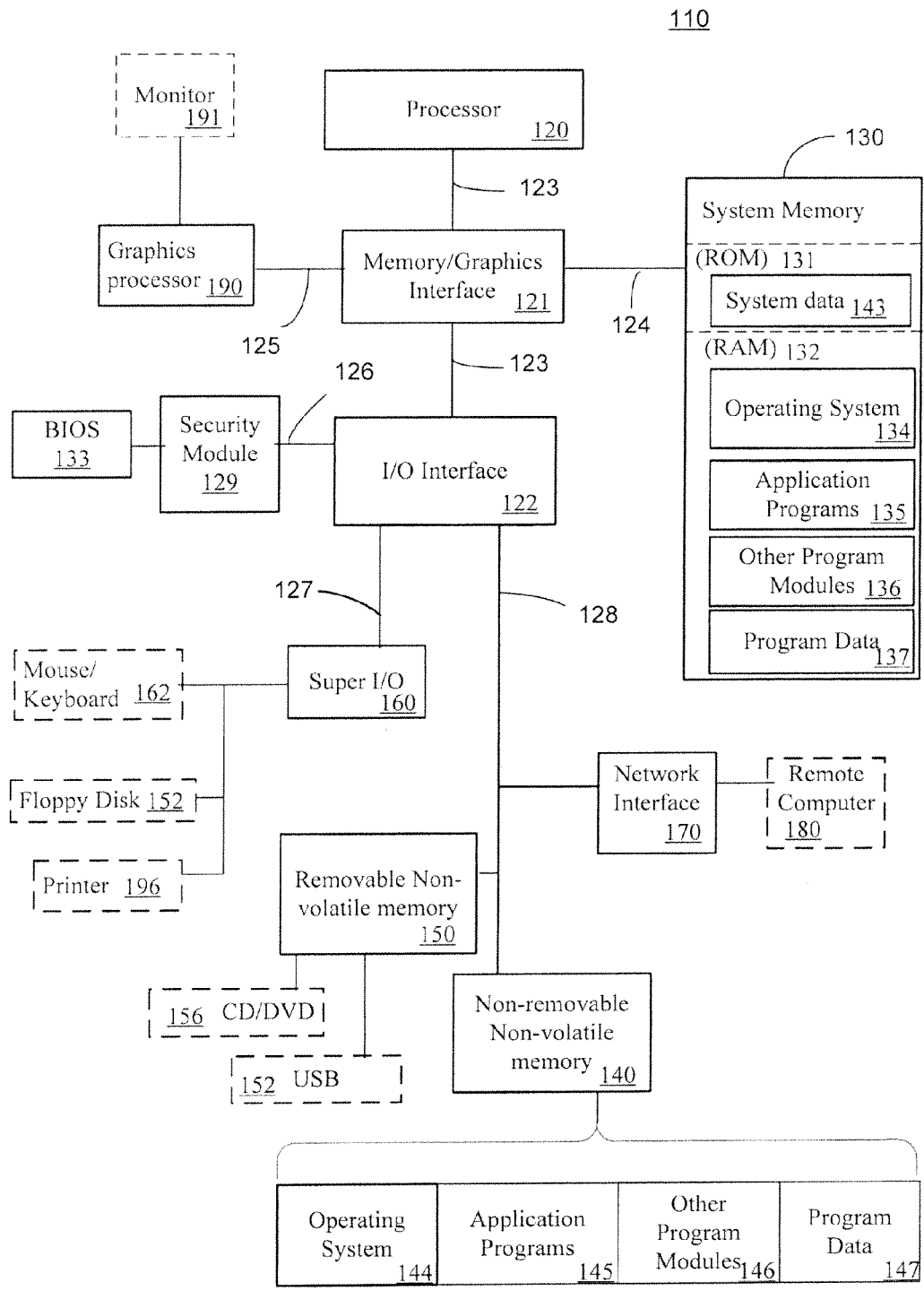
FIG. 16 is an exemplary computer system suitable for hosting an outlier detection tool.

With reference to FIG. 16, an exemplary system for implementing the claimed method and apparatus includes a general purpose computing device in the form of a computer 110. Components shown in dashed outline are not technically part of the computer 110, but are used to illustrate the exemplary embodiment of FIG. 16. Components of computer 110 may include, but are not limited to, a processor 120, a system memory 130, a memory/graphics interface 121 and an I/O interface 122. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer executable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, data stores, or other physical storage elements that physically embody electronic data and excludes any propagated media such as radio waves or modulated carrier signals.

The system memory 130 includes computer storage media in the form of volatile and/or nonvolatile memory such as read only memory (ROM) 131 and random access memory (RAM) 132. The system ROM 131 may contain permanent system data 143, such as computer-specific data that may be used as a seed for generating random numbers or nonces, for example, for use in item selection and statistical calculations. RAM 132 typically contains data and/or program modules that are immediately accessible to and/or presently being operated on by processor 120. By way of example, and not limitation, FIG. 16 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace. In one embodiment, bus 128 may be a Peripheral Component Interconnect (PCI) bus.

The computer 110 may also include other removable/non-removable, volatile/nonvolatile computer storage media. By way of example only, FIG. 16 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 16, provide storage of computer readable instructions, data structures, program modules and other data for the computer 110. In FIG. 16, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical communication ports to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 16 may include a local area network (LAN), a wide area network (WAN), or both, but may also include other networks. Such networking environments are commonplace in offices, enterprise-wide computer networks, intranets, and the Internet.

In summary, the outlier detection tool benefits test reviewers with a convenient and comprehensive tool for analysis and flagging test result outliers indicating potential test conditions such as test subject pre-knowledge, proxy test takers, and test item harvesting.

1. In a first aspect, a computer 110 having computer executable instructions stored in a computer storage media (130, 140) that when executed on a processor (120) of the computer implement a tool for use in analysis of test results comprising:

a screening module implementing a screening criteria entry area for entering a plurality of screening criteria indicating results to be flagged as being anomalous as meeting the screening criteria;

an input area module implementing an input area for entry of test results; a calculation engine module implementing a calculation engine that develops statistical analyses of the test results;

an initial results screening module implementing an initial results screening area showing the statistical analysis by test subject, including display of test results meeting the screening criteria for behavior inconsistent with legitimate test taking;

a test record summary module implementing a test record summary area displaying comprehensive test subject results by test item, including flagged test results data meeting the screening criteria;

a test record detail module implementing a test record detail area comprising an indication of test subjects meeting a test pre-knowledge screening criteria; and a proxy screening module implementing a proxy screening area comprising an indication of test subjects meeting a test proxy screening criteria.

2. The tool of aspect 1, wherein behavior inconsistent with legitimate test taking comprises one of an interrupted test session and evidence of item harvesting.

3. The tool of aspects 1-2, further comprising a summary area module implementing a summary area compiling all test subjects having any statistical result meeting any screening criteria.

4. The tool of aspects 1-3, further comprising a test center results module implementing a test center results area displaying a comparison of composite test subject results by test center.

5. The tool of aspects 1-4, wherein the input area module accepts test result values comprising a test identifier, a test subject identifier, a test facility identifier, a raw response, a correct/incorrect response value, and a response time.

6. The tool of aspects 1-5, wherein the screening criteria entry module plots a composite result for at least one screening criteria as a visual indicator of possible screening criteria set points.

7. The tool of aspects 1-6, wherein the screening criteria entry module includes a test subject cross reference module that accepts plot points and returns a test subject identifier.

8. The tool of aspects 1-7, wherein the screening criteria entry module includes a flagging criteria entry module that designates alert levels for test metrics comprising: raw score values, total test time, and item response time.

9. The tool of aspects 1-8, wherein the screening criteria entry module includes a value designation area that accepts screening criteria values for test metrics comprising: operational test item Rasch measures, pre-test item Rasch measures, misfitting responses, unexpected responses, response randomness, pre-knowledge statistical analysis and proxy statistical analysis.

10. The tool of aspects 1-9, wherein the test record summary module orders test items by most difficult to least difficult on a first axis and orders test subjects by test score on a second axis.

11. The tool of aspects 1-10, wherein the initial results screening module includes a first tool for calculating statistical tests of outlier relationships between two variables.

12. The tool of aspects 1-11, wherein the first tool is a Fisher Exact Test.

13. The tool of aspects 1-12, wherein the screening criteria entry module includes a consecutive kurtosis test for calculating a statistical significance of one or more specific outlier values of a given variable.

14. In a second aspect, a method of analyzing test results using a test analysis tool implemented on a computer (110), the method comprising:

providing the computer having a processor (120), a user interface comprising an input capability (162) and a display (191) both coupled to the processor, a memory (130, 140) coupled to the processor that stores computer executable instructions that when executed on the processor (120) cause the processor (120) to execute instructions;

receiving, via the input capability using instructions implemented on the processor, a plurality of screening criteria indicating results to be flagged as being anomalous as meeting the screening criteria;

storing test results in the memory (130, 140);

calculating, via instructions implemented on the processor (120), a statistical analyses of the test results via a calculation engine of the computer;

applying the one or more of the plurality of screening criteria to the statistical analyses of the test results;

displaying, on the display (191) of the computer (110), an initial results screening area showing the statistical analysis by test subject, including displaying test results meeting the screening criteria for behavior inconsistent with legitimate test taking;

displaying, on the display (191) of the computer (110), comprehensive test subject results by test item, including displaying flagged test results data meeting the screening criteria via a test summary area;

displaying, on the display (191) of the computer (110), an indication of test subjects meeting a test pre-knowledge screening criteria via a test record detail area;

displaying, on the display (191) of the computer (110), an indication of test subjects meeting a test proxy screening criteria via a proxy screening area;

displaying, on the display (191) of the computer (110), a summary of all test subjects having any statistical result meeting any screening criteria; and receiving, via the user interface (162) of the computer (110), supplemental data or commands responsive to display of data meeting one or more screening criteria.

15. The method of aspect 14, wherein displaying of test results meeting the screening criteria for behavior inconsistent with legitimate test taking comprises displaying data meeting a criteria for an interrupted test session.

16. The method of aspect 14-15, wherein displaying of test results meeting the screening criteria for behavior inconsistent with legitimate test taking comprises displaying data meeting a criteria for item harvesting.

17. The method of aspect 14-16, wherein entering a plurality of screening criteria comprises entering one or more of operational test item Rasch measures, pre-test item Rasch measures, misfitting responses, unexpected responses, response randomness, pre-knowledge statistical analysis and proxy statistical analysis.

18. The method of aspect 14-17, wherein developing a statistical analysis of the test results comprises using a Fisher Exact Test to calculate statistical tests of outlier relationships between two variables for a particular case.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer having computer executable instructions stored in a non-transitory computer storage media that, when executed on a processor of the computer, implement a tool for use in analysis of test results, the tool comprising:
    a screening criteria entry module implementing a screening criteria entry area for (i) entry of a plurality of screening criteria indicating results to be flagged as behavior inconsistent with legitimate test taking, and (ii) plotting a composite result for at least one screening criteria of the plurality of screening criteria as a visual indicator of possible screening criteria set points;
    an input area module implementing an input area for entry of test results for a test;
    a calculation engine module implementing a calculation engine that develops statistical analyses of the test results;
    an initial results screening module implementing an initial results screening area showing the statistical analysis by test subject, including display of test results meeting the plurality of screening criteria;
    a test record summary module implementing a test record summary area displaying test subject results by test item, including (i) flagged test results data meeting the plurality of screening criteria, and (ii) a final status determination of a reviewer, wherein a final status determination of a behavior inconsistent with legitimate test taking causes the corresponding test subject to fail the test;
    a test record detail module implementing a test record detail area comprising an indication of test subjects meeting a test pre-knowledge screening criteria of the plurality of screening criteria; and
    a proxy screening module implementing a proxy screening area comprising an indication of test subjects meeting a test proxy screening criteria of the plurality of screening criteria.

2. The tool of claim 1, wherein the plurality of screening criteria comprises criteria indicative of at least one of an interrupted test session or evidence of item harvesting.

3. The tool of claim 1, further comprising a summary area module implementing a summary area compiling all test subjects having any statistical result meeting any screening criteria.

4. The tool of claim 1, further comprising a test center results module implementing a test center results area displaying a comparison of composite test subject results by test center.

5. The tool of claim 1, wherein the input area module accepts test result values comprising at least one of a test identifier, a test subject identifier, a test facility identifier, a raw response, a correct/incorrect response value, or a response time.

6. The tool of claim 1, wherein the screening criteria entry module includes a test subject cross reference module that accepts plot points and returns a test subject identifier.

7. The tool of claim 1, wherein the screening criteria entry module includes a flagging criteria entry module that designates alert levels for test metrics comprising: raw score values, total test time, and item response time.

8. The tool of claim 1, wherein the screening criteria entry module includes a value designation area that accepts screening criteria values for test metrics comprising at least one of: operational test item Rasch measures, pre-test item Rasch measures, misfitting responses, unexpected responses, response randomness, pre-knowledge statistical analysis or proxy statistical analysis.

9. The tool of claim 1, wherein the test record summary module orders test items by most difficult to least difficult on a first axis and orders test subjects by test score on a second axis.

10. The tool of claim 1, wherein the initial results screening module includes a first tool for calculating statistical tests of outlier relationships between two variables.

11. The tool of claim 10, wherein the first tool utilizes a Fisher Exact Test.

12. The tool of claim 1, wherein the screening criteria entry module includes a consecutive kurtosis test for calculating a statistical significance of one or more specific outlier values of a given variable.

13. A method of analyzing test results using a test analysis tool implemented on a computer, the method comprising:
    providing, via a processor of the computer, a user interface comprising an input capability and a display both coupled to the processor;
    receiving, via the input capability, a plurality of screening criteria indicating results to be flagged as behavior inconsistent with legitimate test taking;
    storing test results for a test in a memory of the computer;
    developing, via the processor, statistical analyses of the test results via a calculation engine of the computer;
    applying the plurality of screening criteria to the statistical analyses of the test results;

plotting a composite result for at least one screening criteria of the plurality of screening criteria as a visual indicator of possible screening criteria set points;

displaying, on the display of the computer, an initial results screening area showing the statistical analyses by test subject, including displaying test results meeting the plurality of screening criteria;

displaying, on the display of the computer, test subject results by test item, including displaying flagged test results data meeting the screening criteria within a test summary area;

displaying, on the display of the computer, an indication of test subjects meeting a test pre-knowledge screening criteria of the plurality of screening criteria within a test record detail area;

displaying, on the display of the computer, an indication of test subjects meeting a test proxy screening criteria of the plurality of screening criteria within a proxy screening area; and displaying, on the display of the computer, a summary of test subjects having statistical results meeting a screening criteria of the plurality of screening criteria, wherein the display enables a reviewer to enter a final status determination, wherein a final status determination of a behavior inconsistent with legitimate test taking causes the corresponding test subject to fail the test.

14. The method of claim 13, wherein displaying test results meeting the plurality of screening criteria comprises displaying data meeting a screening criteria indicative of an interrupted test session.

15. The method of claim 13, wherein displaying test results meeting the plurality of screening criteria comprises displaying data meeting a screening criteria indicative of item harvesting.

16. The method of claim 13, wherein receiving a plurality of screening criteria comprises receiving one or more of: operational test item Rasch measures, pre-test item Rasch measures, misfitting responses, unexpected responses, response randomness, pre-knowledge statistical analysis, or proxy statistical analysis.

17. The method of claim 13, wherein developing a statistical analysis of the test results comprises using a Fisher Exact Test to calculate statistical tests of outlier relationships between two variables.

18. A method performed on a computer for screening test results for behavior inconsistent with legitimate test taking, the method comprising:

receiving, at the computer, screening criteria indicative of at least one of proxy test subjects, test pre-knowledge, or test harvesting;

receiving, at the computer via a network connection, test results for a test from one or more test centers;

storing, at a non-transitory computer storage media of the computer, the test results from the one or more test centers;

analyzing, by a processor of the computer, the test results via a calculation engine executed on the computer;

summarizing results meeting the screening criteria by test subject based upon at least one of i) response times, ii) operational test item correct responses vs. pre-test item correct responses, or iii) correct response percentage for first and second test sections;

presenting, via a user interface on the computer, a single graphical output of the summarized results meeting the screening criteria, wherein the graphical output includes a plot of a composite result for at least one screening criteria as a visual indicator of possible screening criteria set points; and enabling a review to enter a final status determination, wherein a final status determination of a behavior inconsistent with legitimate test taking causes the corresponding test subject to fail the test.

19. The method of claim 18, wherein receiving screening criteria further comprises receiving flagging criteria that designate alert levels for test metrics comprising at least one of i) raw score values, ii) total test time, iii) item response times or iv) responses by test center.

* * * * *